(12) United States Patent
Koskela et al.

(10) Patent No.: US 12,348,447 B2
(45) Date of Patent: Jul. 1, 2025

(54) REFERENCE SIGNAL TRANSMISSION

(71) Applicant: Nokia Technologies Oy, Espoo (FI)

(72) Inventors: Timo Koskela, Oulu (FI); Jorma Johannes Kaikkonen, Oulu (FI); Jussi-Pekka Koskinen, Oulu (FI)

(73) Assignee: Nokia Technologies Oy, Espoo (FI)

(*) Notice: Subject to any disclaimer, the term of this patent is extended or adjusted under 35 U.S.C. 154(b) by 206 days.

(21) Appl. No.: 18/258,404

(22) PCT Filed: Nov. 30, 2021

(86) PCT No.: PCT/FI2021/050826
§ 371 (c)(1),
(2) Date: Jun. 20, 2023

(87) PCT Pub. No.: WO2022/148898
PCT Pub. Date: Jul. 14, 2022

(65) Prior Publication Data
US 2024/0039669 A1    Feb. 1, 2024

Related U.S. Application Data

(60) Provisional application No. 63/135,190, filed on Jan. 8, 2021.

(51) Int. Cl.
*H04L 5/00* (2006.01)
(52) U.S. Cl.
CPC .................. *H04L 5/005* (2013.01)
(58) Field of Classification Search
None
See application file for complete search history.

(56) References Cited

U.S. PATENT DOCUMENTS

| 2020/0067755 | A1  | 2/2020 | Pan et al. |
| 2020/0252890 | A1* | 8/2020 | Irukulapati ......... H04W 56/002 |
| 2020/0305232 | A1* | 9/2020 | Miao ..................... H04W 68/02 |

(Continued)

FOREIGN PATENT DOCUMENTS

| WO | 2019/029711 A1 | 2/2019 |
| WO | 2022/078709 A1 | 4/2022 |

OTHER PUBLICATIONS

"New WID: UE Power Saving Enhancements", 3GPP TSG RAN Meeting #86, RP-193239, Agenda: 9.1.2, MediaTek Inc, Dec. 9-12, 2019, 5 pages.

(Continued)

*Primary Examiner* — Diane L Lo
(74) *Attorney, Agent, or Firm* — Nokia Technologies Oy

(57) ABSTRACT

There is provided a method, comprising: determining a presence indicator configuration defining how a presence indicator is to be interpreted, wherein, based on the configuration, the presence indicator indicates whether a set of one or more configured reference signal occasions of a cell carries reference signals; obtaining from a base station the presence indicator; obtaining from the base station at least one reference signal configuration, each indicating at least one configured reference signal occasion; and determining, based on the presence indicator and the obtained presence indicator configuration, whether a given reference signal occasion indicated by the at least one reference signal configuration carries a reference signal.

19 Claims, 6 Drawing Sheets

(56) References Cited

U.S. PATENT DOCUMENTS

2021/0409968 A1\* 12/2021 Taherzadeh Boroujeni ............... H04W 68/005
2023/0063026 A1\* 3/2023 Reial ................ H04W 52/0235

OTHER PUBLICATIONS

"[Draft] LS on signalling method for TRS/CSI-RS occasion(s) for idle/inactive UE(s)", 3GPP TSG RAN WG1 #103-e, R1-2009791, Samsung, Oct. 26-Nov. 13, 2020, 2 pages.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"3rd Generation Partnership Project; Technical Specification Group Radio Access Network; NR; Physical layer procedures for data (Release 16)", 3GPP TS 38.214, V16.3.0, Sep. 2020, pp. 1-166.

"On RS information to IDLE/INACTIVE mode UEs", 3GPP TSG RAN WG1 #103-e, R1-2008934, Agenda: 8.7.1.2, Nokia, Oct. 26-Nov. 13, 2020, 12 pages.

"Summary for TRS/CSI-RS occasion(s) for idle/inactive UEs", 3GPP TSG RAN WG1 #102-e, R1-200xxxx, Agenda: 8.7.1.2, Samsung, Aug. 17-28, 2020, pp. 1-13.

"IEEE 802.11", Wikipedia, Retrieved on Jun. 28, 2023, Webpage available at : https://en.wikipedia.org/wiki/IEEE_802.11.

International Search Report and Written Opinion received for corresponding Patent Cooperation Treaty Application No. PCT/FI2021/050826, dated Mar. 7, 2022, 16 pages.

TRS/CSI-RS occasion(s) for idle/inactive UEs, 3GPP TSG RAN WG1 #103-e, R1-2007674, Agenda: 8.7.1.2, vivo, Oct. 26-Nov. 13, 2020, 9 pages.

"Moderator summary for TRS/CSI-RS occasion(s) for idle/inactive UEs", 3GPP TSG RAN WG1 #103-e, R1-2008178, Agenda: 8.7.1.2, Samsung, Oct. 26-Nov. 13, 2020, pp. 1-51.

"On TRS/CSI-RS occasion(s) for idle/inactive UEs", 3GPP TSG RAN WG1 #103-e, R1-2008369, Agenda: 8.7.1.2, Sony, Oct. 26-Nov. 13, 2020, pp. 1-7.

"On RS information to IDLE/INACTIVE mode UEs", 3GPP TSG RAN WG1 #104-e, R1-2101665, Agenda: 8.7.1.2, Nokia, Jan. 25-Feb. 5, 2021, 12 pages.

\* cited by examiner

REFERENCE SIGNAL TRANSMISSION

TECHNICAL FIELD

Various example embodiments relate generally to transmission of reference signals for idle/inactive users in a communication network.

BACKGROUND

For user equipment (UE) power, it may not be sensible for an idle/inactive UE to try blind decoding each reference signal occasion in a cell. In particular, always-on reference signal, such as tracking reference signal/channel state information reference signal (TRS/CSI-RS), transmission by a gNB is not required. For example, when there are no connected UEs in the cell, the gNB may decide to refrain from TRS/CSI-RS transmission. Consequently, there is need to specify means to indicate TRS/CSI-RS occasion(s) available for connected mode UEs to IDLE/Inactive mode UEs, while at the same time minimizing system overhead impact.

BRIEF DESCRIPTION

According to some aspects, there is provided the subject matter of the independent claims. Some further aspects are defined in the dependent claims.

The embodiments that do not fall under the scope of the claims are to be interpreted as examples useful for understanding the disclosure.

LIST OF THE DRAWINGS

In the following, the invention will be described in greater detail with reference to the embodiments and the accompanying drawings, in which FIG. 1 presents a communication network, according to an embodiment;

DESCRIPTION OF EMBODIMENTS

Figure 1:
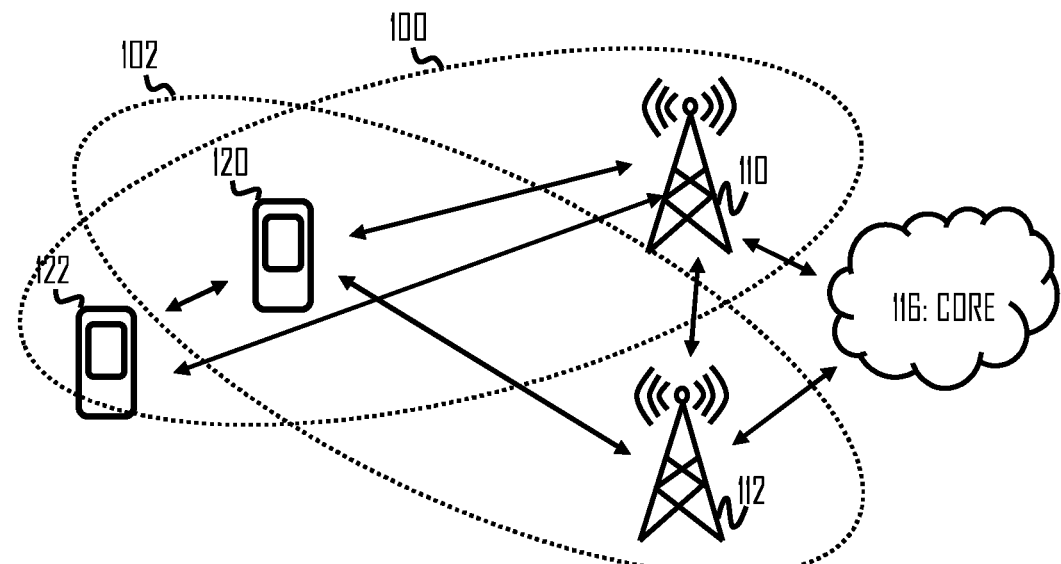

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a subband, a frequency region, a sub-carrier, a beam, etc. The term "transmission" and/or "reception" may refer to wirelessly transmitting and/or receiving via a wireless propagation channel on radio resources The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integrable with existing legacy radio access technologies, such as the LTE.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure.

The virtual networks are then customised to meet the specific needs of applications, services, devices, customers or operators.

In radio communications, node operations may in be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation. Thus, 5G networks architecture may be based on a so-called CU-DU split. One gNB-CU controls several gNB-DUs. The term 'gNB' may correspond in 5G to the eNB in LTE. The gNBs (one or more) may communicate with one or more UEs. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

In an embodiment, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future rail-way/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

The embodiments may be also applicable to device-to-device (D2D), machine-to-machine, peer-to-peer (P2P) communications. The embodiments may be also applicable to vehicle-to-vehicle (V2V), vehicle-to-infrastructure (V2I), infrastructure-to-vehicle (I2V), or in general to V2X or X2V communications.

FIG. 1 illustrates an example of a communication system to which embodiments of the invention may be applied. The system may comprise a control node 110 providing one or more cells, such as cell 100, and a control node 112 providing one or more other cells, such as cell 102. Each cell may be, e.g., a macro cell, a micro cell, femto, or a pico cell, for example. In another point of view, the cell may define a coverage area or a service area of the corresponding access node. The control node 110, 112 may be an evolved Node B (eNB) as in the LTE and LTE-A, ng-eNB as in eLTE, gNB of 5G, or any other apparatus capable of controlling radio communication and managing radio resources within a cell.

The control node 110, 112 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node to the UE 120 and uplink (UL) communication from the UE 120 to the control node.

Additionally, although not shown, one or more local area access nodes may be arranged such that a cell provided by the local area access node at least partially overlaps the cell of the access node 110 and/or 112. The local area access node may provide wireless access within a sub-cell. Examples of the sub-cell may include a micro, pico and/or femto cell. Typically, the sub-cell provides a hot spot within a macro cell. The operation of the local area access node may be controlled by an access node under whose control area the sub-cell is provided. In general, the control node for the small cell may be likewise called a base station, network node, or an access node.

There may be a plurality of UEs 120, 122 in the system. Each of them may be served by the same or by different control nodes 110, 112. The UEs 120, 122 may communicate with each other, in case D2D communication interface is established between them.

The term "terminal device" or "UE" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. An interface between an eLTE access point and a 5G access point, or between two 5G access points may be called Xn. Other communication methods between the access nodes may also be possible. The access nodes 110 and 112 may be further connected via another interface to a core network 116 of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and there the core network may comprise e.g. an access and mobility management function (AMF) and a user plane function/gateway (UPF), to mention only a few. The AMF may handle termination of non-access stratum (NAS) signalling, NAS ciphering & integrity protection, registration management, connection management, mobility management, access authentication and authorization, security context management. The UPF node may support packet routing & forwarding, packet inspection and QoS handling, for example.

Reference signals are used to convey a reference point from a transmitter to a receiver. The content of the reference signal is known to both parties, and the reference signals can thus be used e.g. for extracting propagation channel characteristics. For example, CSI-RS, receivable by the UE, may be used to estimate the channel and report channel quality information back to the gNB. Term CSI-RS refers to channel state information reference signal and these signals are transmitted typically in downlink. It may additionally be used for reference-signal-received-power (RSRP) measurements during mobility and beam management, and for frequency/time tracking, demodulation and UL reciprocity based precoding. The CSI-RS may be configured specific to UE, but in some implementations multiple users can also share the same reference signal resource. The CSI-RS can be periodic, semi-persistent or aperiodic (due to downlink control information, DCI, triggering). For time/frequency tracking, CSI-RS can either be periodic or aperiodic. Although the description uses CSI-RS as an example, the described embodiments are applicable to any other reference signal type.

A TRS/CSI-RS occasion is a time/frequency resource configuration for transmission of the CSI-RS from the gNB in the cell. TRS/CSI-RS may comprise of transmission of CSI-RS in one or more symbols in one or more slots. Slot may comprise of one or more symbols. The TRS/CSI-RS occasion(s) that may be for connected mode UEs can be shared to idle/inactive mode UEs. However, it should be noted that TRS/CSI-RS in the TRS/CSI-RS occasion(s) may or may not be actually transmitted. It may be up to gNB implementation whether or not to transmit a TRS/CSI-RS for idle/inactive UEs even when the TRS/CSI-RS is not needed by connected UEs (e.g., when there is a connected mode UE in a cell but the UE is no longer using the TRS/CSI-RS, or when there is no longer any connected mode UE in a cell, etc.).

In an embodiment, system information block (SIB) signalling provides the configuration of TRS/CSI-RS occasion(s) for idle/inactive UE(s). In other words, this indicates to the idle/inactive UEs when the CSI-RS may potentially be sent. As said, it may be that the gNB is not transmitting CSI-RS at each available occasion. Consequently, it may be beneficial that the UE is not blind decoding each occasion. Regardless, one option is that the availability of TRS/CSI-RS at the configured occasion(s) is not informed to the UE. This may require the UE to blind decode each occasion. In some other options, the availability of TRS/CSI-RS at the configured occasion(s) is informed to the UE. This way the UE may become aware which occasions actually carry the CSI-RSs. Yet in one option, the conditional availability of TRS/CSI-RS at the configured occasion(s) is informed to the UE, where the condition can be, e.g., existence of paging. Any combination of these options is applicable as well.

In NR, there may be plurality of beams present in the cell. For example, a synchronization signal block (SSB) may carry one or more CSI-RSs among other information. SSB refers to Synchronization/PBCH block because Synchronization signal and PBCH channel are packed as a single block. The components of this block may comprise a synchronization signal: PSS (Primary Synchronization Signal) and SSS (Secondary Synchronization Signal), and physical broadcast channel (PBCH) carrying PBCH demodulation reference signal (DMRS) and PBCH data.

As an example, in NR Rel. 15, the UE is informed about the actually transmitted SSBs in the serving cell via broadcast and/or (optionally) dedicated signalling. In FR1, where at maximum eight SSBs are supported, a single 8 bit field (inOneGroup) is used to convey the information in the broadcast. In FR2, at maximum 64 SSBs are supported. The indication of the actually transmitted SSBs among the 64 candidate SSB candidate locations in FR2 is provided with 16 bits via two fields in ssb-PositionsInBurst: groupPresence and inOneGroup. The information regarding the 64 candidate SSB locations is compressed by splitting the 64 candidate locations to 8 groups, with 8 candidate locations in each. The IE 'inOneGroup' indicates with eight bits, that in which of the eight candidate locations in each active group a SSB is actually transmitted. Then with the UE 'groupPresence', eight bit field are used to indicate that which of the eight possible groups are active, i.e. have SSBs transmitted as indicated by 'inOneGroup' field. Thus, each of the active groups may have identical number of SSBs transmitted. Although described with 8+8 construction, any number of beams in any kind of group configuration is possible.

The TRS configuration is provided via NZP-CSI-RS-ResourceSet, where each individual RS configuration belonging to the resource set is indicated via an ID, and a trs-Info flag is used to indicate if the RS configurations share the same antenna port. Each resource ID may correspond to a RS configuration, provided by NZP-CSI-RS-Resource, where NZP stands for non-zero-power. In TRS configuration, there are two RS symbols per slot (in one or two slots), hence there are two RS configurations (NZP-CSI-RS-Resource) in the corresponding resource set (NZP-CSI-RS-ResourceSet) per slot. The NZP-CSI-RS-Resource IE comprises e.g. the following IEs:

'NZP-CSI-RS-ResourceId' gives the logical index of the said RS configuration,

'CSI-RS-ResourceMapping' and 'CSI-ResourcePeriodicityAndOffset' provides frequency and time domain mapping to physical resources for the RS, The 'CSI-RS-ResourceMapping' contains the resource element locations in frequency domain, number of antenna ports and symbol location (in a slot). In addition, the information of code-domain multiplexing (CDM) and density are provided in this IE.

Some of the parameters in 'CSI-RS-ResourceMapping' have fixed values or value ranges in case of TRS. Namely, number of antenna ports is set to 1 ('nrofPorts'), CDM is not allowed ('cdm-Type') and density is fixed to 3 ('density'). Thus, when providing information regarding TRS occasions for IDLE/INACTIVE mode UEs, these parameters can be in principle omitted from the parameters.

'powerControlOffsetSS' sets the power offset versus SSS that UE can assume,

Note: 'powerControlOffset' may not be necessary for IDLE/INACTIVE UEs

'ScramblingId' determines the scrambling initialization, and

'qcl-InfoPeriodicCSI-RS' provides reference to a TCI-State indicating QCL source for the (T)RS.

The QCL relationship information between two reference signals may provide the UE with the information (that may be configured by network) that specific properties are shared between the reference signals. The properties can include, e.g., antenna port quasi-co-location. A QCL information or QCL relationship may refer to following but not limited to it: The UE may be configured with a list of up to M TCI state configurations within, e.g., the parameter PDSCH-Config. The TCI state configurations may be used to decode physical downlink shared channel (PDSCH) according to a detected PDCCH with downlink control information (DCI) intended for the UE and the given serving cell. M may depend on the UE capability maxNumberConfiguredTCIstatesPerCC. Each TCI state may include parameters for configuring a quasi-co-location relationship between one or two downlink reference signals and the DMRS ports of the PDSCH, the DMRS port of PDCCH, or the CSI-RS port(s) of a CSI-RS resource. The quasi-co-location relationship may be configured by the parameter qcl-Type1 for the first DL RS, and qcl-Type2 for the second DL RS. For the case of two DL RSs, the QCL types may not be the same, regardless of whether the references are to the same DL RS or different DL RSs. The quasi-co-location types corresponding to each DL RS may be provided by the parameter gcl-Type in the QCL-Info information element (IE) and may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; 4) 'QCL-TypeD': {Spatial Rx parameter}.

One aspect to be considered on the TRS/CSI-RS occasion(s) for IDLE/INACTIVE mode UEs is the indication of the presence ('presence indication', PI) of the potential TRS/CSI-RS on the provided occasions as opposed to the UE autonomously detecting the presence of the TRS/CSI-RS occasions. As from network power consumption perspective it is not desirable to mandate transmission unnecessary transmission of e.g. the TRS, if there are no Connected mode UEs using them. This can result in unnecessary overhead if the presence indication is transmitted frequently or Connected mode UEs are present only in sub-set of cell area/beams.

As an example, the UE may be provided the TRS/CSI-RS occasions, i.e. the configuration in the system information, but whether network actually transmits the TRS/CSI-RS on the provided occasions may change rather dynamically. In case there would not be a presence indication but only a configuration, the UE would need to blind detect the signals. This could potentially diminish the power saving gains. If UE does not have certainty that the RS are actually present in the informed/configured occasions, UE would not be able to utilize them to the fullest extent. For example, a UE would not be able to skip SSB monitoring occasions in advance and trust that it can receive the potential TRS/CSI-RS occasion(s) later, which may be beneficial to e.g. update the time/frequency synchronisation e.g. for paging monitoring. From this perspective it is seen that the presence indication would be beneficial. Moreover, in beam based systems, there might be Connected mode UEs only in the subset of beams, and the beams could be UE specific, thus there might not be active TRS/CSI-RS on all beams.

As shown above, one problem with TRS/CSI-RS is that the UE may not know is the gNB transmitting the TRS/CSI-RS in the configured occasion or not. To at least partially tackle this problem, there is proposed a solution for indicating the presence of TRS/CSI-RS on one or more configured RS occasions in an efficient manner.

Figure 2:
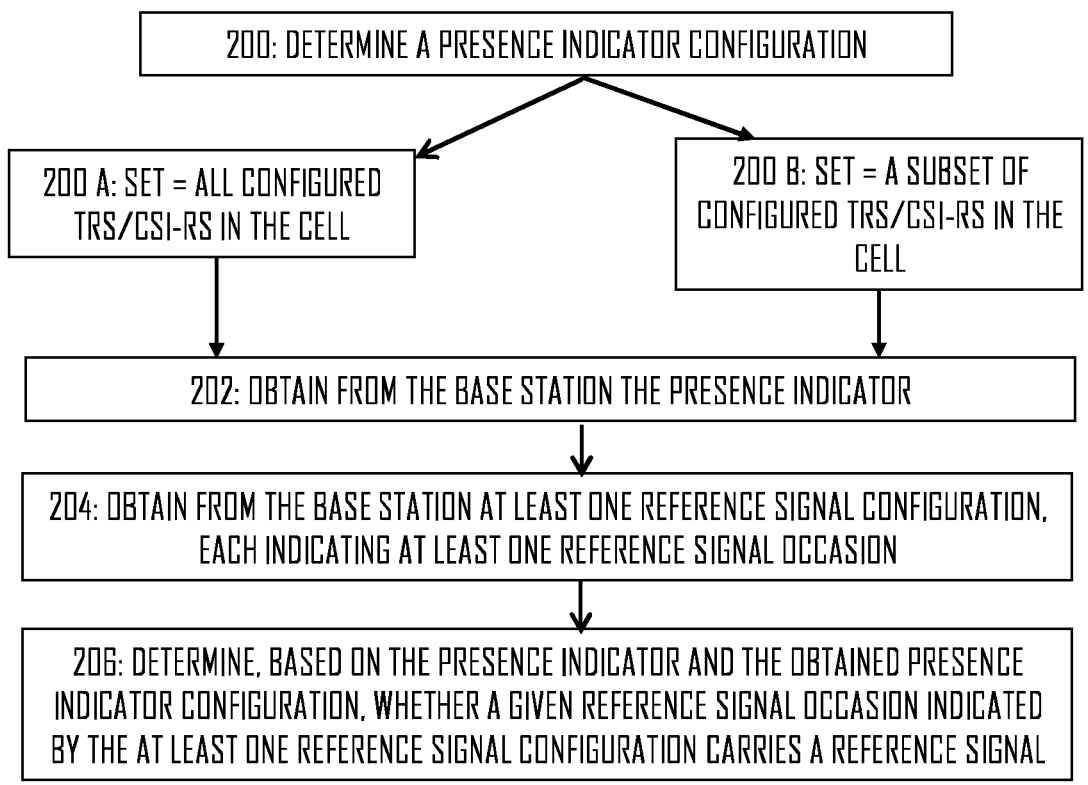
FIGS. 2 to 5, 7 and 8 illustrate flow diagrams, according to some embodiments.

FIG. 2 depicts an example method. The method may be performed by a user equipment, such as the UE 120. In an embodiment, the UE 120 is a user equipment (camping) in a radio resource control, RRC, idle or inactive state. In such RC idle or RRC inactive mode, the UE may detect paging and broadcasting performed by the network node, such as the BS 110. Further, the UE 120 may try to decode RS (s) on RS occasion(s).

Accordingly, as shown in FIG. 2, the UE 120 may in step 200 determine a configuration for a presence indicator (PI), i.e. a PI configuration. In one embodiment, the UE determines the PI configuration based on a pre-configuration of the UE. In another embodiment, the UE determines this PI configuration based on receiving information indication the PI configuration from a base station of a cell (e.g. from the gNB 110). The PI configuration may be received in a control message, for example.

In an embodiment, based on the configuration, the presence indicator indicates whether or not a set of one or more configured reference signal occasions of the cell carries reference signals.

In an embodiment, based on the configuration, the presence indicator indicates whether a set of one or more configured reference signal occasions associated with at least one synchronization signal block (SSB) of the cell carries reference signals.

In an embodiment, a first configuration may be indicated, as depicted in step 200A. In this configuration, the set may comprise all configured RS occasions in the cell. According to the first configuration, the PI indicates whether all or none of the reference signal occasions associated with SSBs of the cell carry reference signals. In this embodiment, the PI may be e.g. a one bit indicator, where bit '1' indicates that all RS occasions are used by the network node to transmit the RS and a bit '0' indicates that none of the RS occasions are used by the network node to transmit the RS in the cell, or vice versa.

In an embodiment, a second configuration may be indicated, as depicted in step 200B. In this configuration, the set may comprise only a subset of configured RS occasions in the cell. I.e. the subset comprises at least one but not all configured reference signal occasions of the cell According to the second configuration, the PI (or a bit in a PI) indicates whether the subset of reference signal occasions associated with at least one SSB of the cell carry reference signals.

In this embodiment, the length of the PI may be one or several bits (or a plurality of 1-bit PIs are configured). If only this second configuration is indicated, then the second configuration is the only configuration, despite the term "second" use herein.

In one embodiment, the subset or each of the subsets (in case of several bits in the PI) may comprise RS occasions in one or more SSBs or in one or more SSB groups. In one embodiment, the subset may comprise RS occasions based on one or more RS configurations or based on one or more RS configuration groups.

In the second configuration, the PI or each bit of the PI may refer to a specific one or more RS configurations or to one or more SSB, but not to all RS configurations or SSBs of the cell. Each RS configuration or SSB may be associated with one or more RS occasions, thus a subset of at least one RS occasion is indicated to the UE by the PI or by each bit of the PI. For example, the PI sent to the UE may refer to a SSB #1 (=occasions in SSB #1 or in SSB group #1) or RSconfig #1 (=occasions based on RSconfig #1 or based on RSconfigGroup #1). When there are many bits, the first bit of the PI may refer to SSB #1 while another bit refers to another SSB ID, for example. It may be noted that because each RS configuration is associated to a specific one or more SSBs, then either directly or at least implicitly the indicated subset refers to one or more SSBs.

In an embodiment, there may be multiple configurations provided to the UE, so as to allow the gNB to later dynamically change the configuration between the plurality of provided PI configurations. In one embodiment, both the first and second configurations are provided initially to the UE, and later an indication of which configuration to use may be provided to the UE. For example, in one embodiment the PI configuration (e.g. sent over RRC) may comprise a flag/configuration to indicate whether the PI (possibly 1 bit) corresponds to all configured occasions in the cell or whether UE is to follow the subset-specific PI configuration.

In step 202, the UE 120 may receive from the base station the presence indicator (PI). It needs to be noted that the order of steps may not be as depicted in FIG. 2, but e.g. the PI may be received before or simultaneously with the PI configuration of step 200. As said above, the PI may have one or more bits, depending on the embodiment.

In an embodiment the UE may receive a configuration for transmission of SSBs during an SS-burst in a cell 102. This may be received over system information block 1, SIB1, for example.

In step 204, the UE may obtain from the base station at least one reference signal configuration, each indicating at least one configured reference signal occasion. Again, the order of steps 200-204 may vary from what is depicted in FIG. 2. The RS configuration (also called RS resource configuration) may be carried to the UE in SIB, or in dedicated manner in RRC Connection Release or in other RRC signalling. In an embodiment, the configuration of RS occasions to the IDLE/INACTIVE mode UEs can be provided independently for each broadcast/SSB beam.

The reference signal occasions indicated by a given RS configuration may be comprised in one or more SSBs, for example. The RS configuration may specify the RS occasions by time and frequency locations, and/or by quasi-co-location association with one or more SSBs (e.g. via a TCI-stateId in the RS configuration), for example. In other words, each RS configuration may have a parameter associating the RS configuration to a specific one or more SSBs. In yet one embodiment, the UE 120 may instead or additionally receive a configuration message providing the UE 120 with information on association between one or more TRS/CSI-RS (i.e. occasions indicated in one or more RS configurations) and one or more SSBs.

In one embodiment, the RS configurations are provided for all of the SSBs in the cell. The presence indication then further indicates whether the TRS is actually present in the configured RS occasions of the SSB or not.

In step 206, the UE may determine, based on the PI and the obtained PI configuration, whether a given reference signal occasion indicated by the at least one RS configuration carries a reference signal. Based on this determination the UE may advantageously decide either to monitor for the reference signal or not in the given RS occasion. If the network node is not transmitting anything in the given occasion, the UE may advantageously save power by not performing blind detection for this given RS occasion.

In an embodiment, the RS comprises a tracking reference signal and/or a channel state information reference signal, TRS/CSI-RS transmitted in downlink from the base station 110. The transmission occasions for the RSs may be defined by the received RS configuration. However, as said, the PI then indicates whether or not the occasion is actually used by the gNB 110 for transmission of the RS or not.

Although TRS/CSI-RS is used in the description as the example reference signal, the proposed embodiments are applicable to any other type of reference signals as well.

In an embodiment, the association between the RS occasions and the SSBs is based on at least one of a quasi-co-location relationship between the reference signal occasions and SSBs, time-frequency location of the reference signal occasions in relation to the SSB(s), and association configuration message received from the network. For example, the RS occasions are defined in the received RS configuration, and the RS configuration may have a specific quasi-co-location, QCL, with a specific one or more SSBs. Thus, the occasions are QCLed with the SSB(s). As another example, the time and/or frequency location(s) of the occasion(s) may overlap at least partially with the SSB(s), and if this happens, the occasions (or subset thereof) may be associated with the overlapping SSB.

In an embodiment, at least according to the second configuration for the PI, the PI indicates those at least one SSB but not all SSBs of the cell where the reference signals are present. In case the SSBs are grouped, the PI may indicate those at least one SSB group but not all SSB groups of the cell where the reference signals are present.

In another embodiment, the PI indicates those at least one reference signal configuration but not all reference signal configurations of the cell according to which the reference signals are transmitted. In case the RS configurations are grouped, the PI may indicate those at least one RS configuration group but not all RS configuration groups of the cell according to which the reference signals are actually transmitted, i.e. are present.

Figure 3:
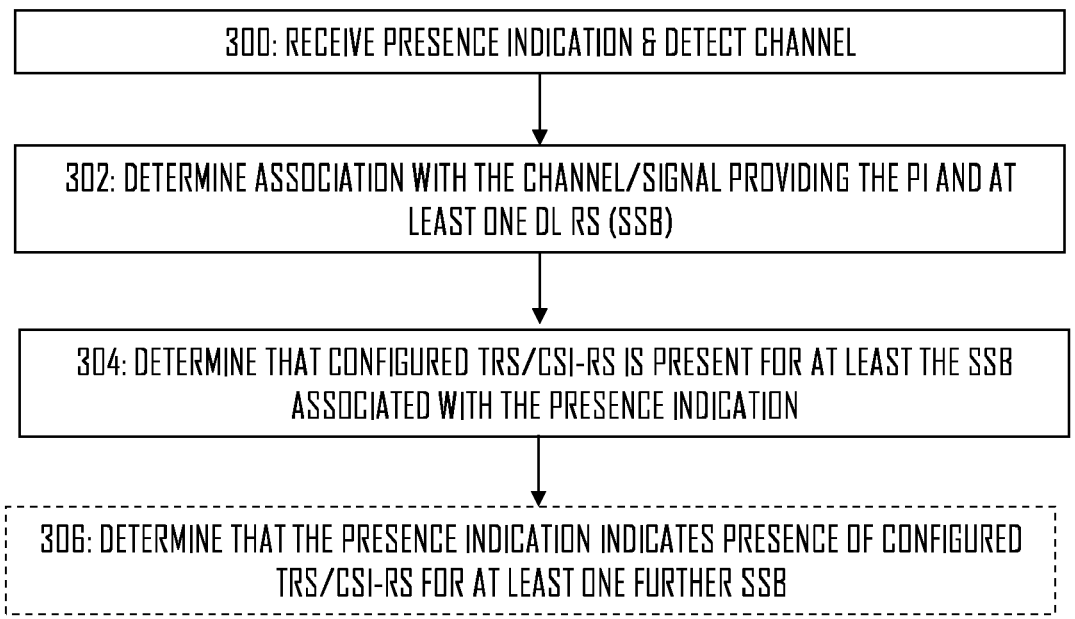

In an embodiment, as shown in FIG. 3, the UE 120 in step 300 detects a channel from which the PI is received. Then, the UE in step 302 associates the detected channel with at least one SSB. For example, the UE may determine which SSB is received from the same spatial direction (may be referred as QCL typeD, spatial RX, and other QCL types are not excluded) as the channel on which the PI is present. This may imply QCL between the PI and the SSB(s). As an example if PI is carried by, or is a DCI message (the DCI may or may not carry also EPI/PEI information) which is transmitted using PDCCH, UE may determine the association between the PI and an SSB through the QCL assumption between the DMRS of the PDCCH carrying the DCI and the SSB. In another example, if a PI is carried by a reference signal (e.g. a sequence that may or may not serve also as PEI/EPI), the reference may be associated to an SSB by QCL relationship. Consequently, the UE 120 may determine in step 304 that the set of RS occasions corresponding to this PI include those RS occasions that are comprised in the determined at least one SSB.

FIG. 3, step 306, explains that the UE 120 may determine that the PI also indicates presence of configured RS for at least one further SSB. This may be based on grouping of SSBs or RS configurations, as will be described.

Figure 4:
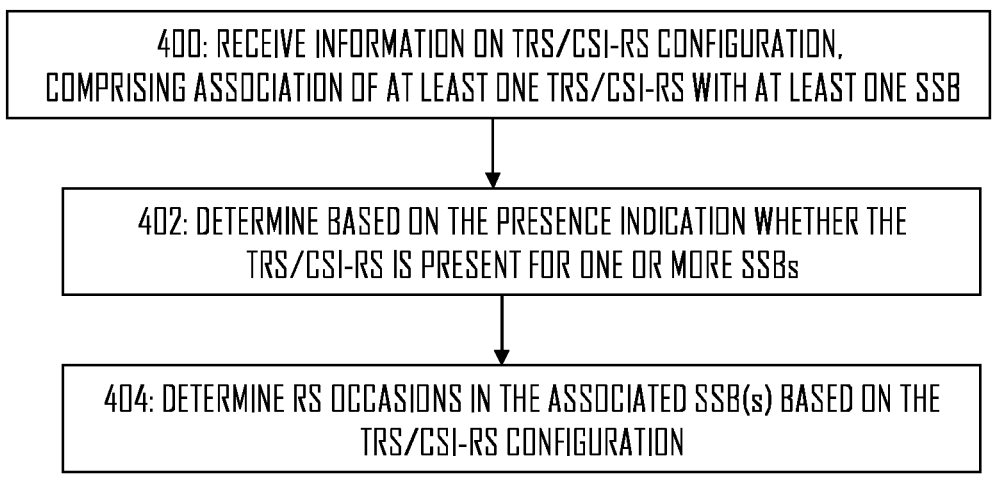

In an embodiment, as shown in FIG. 4, the UE 120 may in step 400 associate at least one SSB with the obtained at least one RS configuration. The associating may be based on at least one of: a quasi-co-location information between the at least one RS configuration and the at least one SSB, time/frequency location of the RS occasions indicated in the RS configuration, and an association configuration message received from the base station 110 indicating association between the at least one RS configuration and the at least one SSB. Thereafter, the UE 120 may determine in step 402, based on the PI and its configuration, that reference signals from the base station are present in the at least one SSB, and in step 404 determine the reference signal occasions in the at least one SSB based on the associated at least one RS configuration.

In an embodiment, the PI is received in each of the at least one RS configuration that the UE 120 may receive. This may provide an efficient manner of associating a given PI with a specific RS configuration and/or with at least one SSB that is associated (via QCL) with the RS configuration. In case the presence indication would be carried in the RS configuration itself, the dynamic presence indication could potentially cause high amount of SI update indications in a cell. In that case, a special SI update indication may be used to imply that the PI has changed for the cell. Then, UEs that are not interested in monitoring the RS, can ignore the SI update.

In an embodiment, the presence indicator is received in an early paging indicator message (EPI/PEI). For NR idle/inactive-mode paging enhancement, paging early indication before paging occasion (PO) may be supported. Paging early indication before a target PO, may also be referred as wake up signalling (WUS) or DCP (DCI with CRC scrambled by PS-RNTI), and may be used for indicating to the UE whether the UE needs to wake up to monitor physical downlink control channel (PDCCH) scrambled with paging radio network temporary identifier (P-RNTI) at the PO. In other words, the EPI/PEI may indicate to a UE whether it will be or may be paged on a PO associated with the EPI/PEI. Potential candidate indication methods include e.g. downlink control information (DCI)-based indication, e.g., based on extending existing DCI format 1_0 or 2_6, or a new DCI format, or a RS-based or sequence-based indication, e.g., based on TRS/CSI-RS or secondary synchronization signal (SSS).

In the embodiment where the PI is carried in the early paging message, the PI may be associated with a parameter informing which at least one reference signal configuration or at least one SSB the PI relates to. In one embodiment, the association may be obtained by detecting that the spatial direction (e.g. through QCL relationship between the channel/RS that provides or is associated with PI and other RS such as SSB) from which the PI is received is the same as one or more SSBs. In yet one embodiment, the early paging message carrying the PI is sent by using a specific DCI format dedicated for this purpose, so that the UE 120 immediately detects that PI is present in this early paging message.

In an embodiment, the presence indicator is received by UE 120 in a broadcast message such as system information broadcast message (SIB). In an embodiment, the presence indicator is received by UE 120 in dedicated or in group-dedicated or in broadcast manner. The PI may be transmitted in, or the PI is, a MAC CE, DCI or an RRC message.

In an embodiment, the presence indicator is transmitted by UE 120 in a system information broadcast message (SIB). In one further example the presence information may be provided in a SIB in group specific manner i.e. network may indicate that TRS/CSI-RS are present for specific group or groups or all the groups. The indication may be in a form of bitmap. The bitmap may have a bit field for each of the SSB and/or TRS/CSI-RS or the groups of SSB and/or TRS/CSI-RS. A bit in the bitmap indicates whether the TRS/CSI-RS or group of TRS/CSI-RS are present/transmitted by network 110. The bitmap may include bit fields for the SSB or TRS/CSI-RS that have no TRS/CSI-RS configured (e.g. the bitmap may have fixed length that may depend on the maximum number SSBs that are transmitted by NW 110 in a cell). In one other example, network 110 may provide indication (e.g. in a SIB or in other RRC message) that which configured TRS/CSI-RS occasions have the TRS/CSI-RS present. The indication may be in a form of a bitmap e.g. where the bitmap has e.g. bit field for each configured occasion (SSB based bitmap or TRS/CSI-RS based bitmap) i.e. bitmap may have entries for configured occasions. The occasions may be configured in broadcast message such as SIB or in dedicated manner via RRC.

In an embodiment, the presence indicator may be provided (UE 120 may receive it) to UE 120 or UEs in RRC CONNECTED mode. In an embodiment, the presence indicator may be provided in an RRC message such as RRC Release message or any message that is provided to UE 120 prior to entering IDLE/INACTIVE mode. UE may be configured to (allow to) request the presence information for one or more TRS/CSI-RS occasions. The request may be e.g. an RRC message, MAC CE, PUSCH message, PUCCH message or a RACH preamble or an uplink signal SR/SRS. The request may provide network an indication that UE requests the presence indication to be provided by network.

Figure 5:
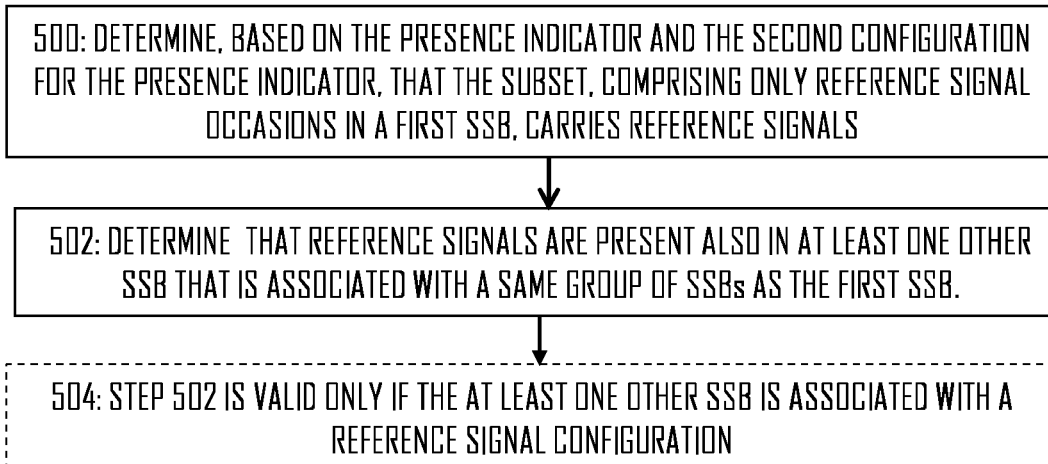

In an embodiment, shown in FIG. 5, the UE 120 determines in step 500, based on the PI and the configuration for the PI, that the set carries RSs and that the set (subset) comprises only reference signal occasions in a given SSB. In step 502, the UE 120 further determines that RSs (of the same type, such as TRS/CSI-RS) are present also in at least one other SSB that is associated with a same group of SSBs as the first SSB. In an embodiment, the SSBs belong to the same group of SSBs when the SSBs are associated with a same grouping parameter. The grouping parameter may comprise e.g. a groupPresence indication in an ssb-PositionsInBurst information element, which the UE 120 may have received from the base station.

As an example related to this embodiment of FIG. 5, the PI is a one 1-bit indication indicating that TRS/CSI-RS are present for a group of SSBs that are under the same grouping parameter in ssb-PositionsInBurst. When the PI-bit is set, the UE determines that all the SSBs that are indicated to be transmitted within the same group (e.g. via grouping parameters (groupPresence/inOneGroup)) and have the TRS/CSI-RS occasion configured can be assumed to have the TRS/CSI-RS present. Indeed, as shown with optional step 504, a further criterion for determining that reference signals are present in the at least one other SSB may be whether the at least one other SSB is associated with a RS configuration. On the other hand, when UE detects that the bit is not set (or is set to '0'), the UE 120 may assume that none of the TRS/CSI-RS occasions are present for the whole group of SSBs. In an embodiment, when UE 120 detects that the PI is set for a specific TRS-CSI-RS configuration, the UE 120 determines the associated SSB index through the TRS/CSI-RS configuration (the SSB is used as a QCL source for the TRS/CSI-RS) and further determines that all the SSBs that are indicated to be in the same group carry reference signals as well. As a more specific example, let us assume the UE 120 determines that TRS/CSI-RS is configured with an ID #1 (ID of RS configuration) and SSB #0 is configured as a QCL source for this RS configuration, and that another TRS/CSI-RS is configured with an ID #2 and SSB #1 is configured as the QCL source, and that SSB #1 and SSB #2 are in the same group. Then, if the UE detects PI for the TRS/CSI-RS ID #1, the UE 120 may determine/assume, based on the SSB index grouping information, that the TRS/CSI-RS ID #2 is also present (i.e. transmitted by the gNB 110). In case e.g. an SSB #3 belongs to different group than SSB #1 and SSB #2, the UE 120 may not determine the presence of the configured TRS/CSI-RS that has the SSB #3 as the QCL source.

Similarly, in case RS configurations are grouped via a grouping parameter received in each RS configuration, or via a separate grouping message from the network, the UE 120 may determine, based on the presence indicator and the configuration for the presence indicator, that the set of RS occasions carries reference signals and that the set (subset) comprises only RS occasions based on or indicated by a first RS configuration. Consequently, in this embodiment, the UE 120 may determine that RSs are present also based on at least one other RS configuration that is associated with a same group of RS configurations as the first RS configuration. In an embodiment, the UE receives a configuration providing information on association between one or more TRS/CSI-RSs and one or more SSBs. The UE may also receive information on grouping one or more TRS/CSI-RSs (indicated by one or more RS configurations) in one or more groups. Then, when the UE receives a PI indicating that a first SSB associated with a first RS configuration carries TRS/CSI-RS, the UE may determine/assume that at least one other SSB associated to another RS configuration belonging to the same group of RS configurations as the first RS configuration also carries TRS/CSI-RSs to the UE.

Figure 6A:
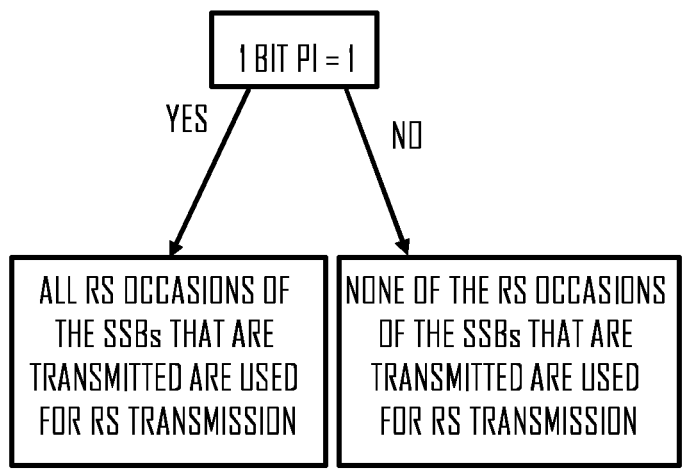
FIGS. 6A and 6B depict example PI configurations, according to some embodiments.

In an embodiment, the presence indicator comprises only a single bit, as shown in FIG. 6A. This may be the case, e.g. in the first configuration where the PI indicates that all or none of the TRS/CSI-RS occasions have the CSI-RS present in the cell in all the actually transmitted SSBs (that are associated with/have the TRS/CSI-RS configuration). However, also the second PI configuration mentioned above may take use of the 1 bit configuration. For example, the 1 bit PI may there indicate that a specific subset of RS occasions is to carry RSs, the subset being defined by the PI configuration. The PI configuration may define e.g. that the PI refers to all RS occasions or to RS occasions in a specific SSB ID or to RS occasions based on a specific RS configuration ID.

In another embodiment, the presence indicator comprises a plurality of bits, each bit indicating whether a given subset of configured reference signal occasions associated with at least one SSB of the cell carry reference signals. The PI having many bits may also be seen as configuring a plurality of 1-bit PIs, each 1-bit PI indicating whether a given subset of configured RS occasions carries reference signals.

Figure 6B:
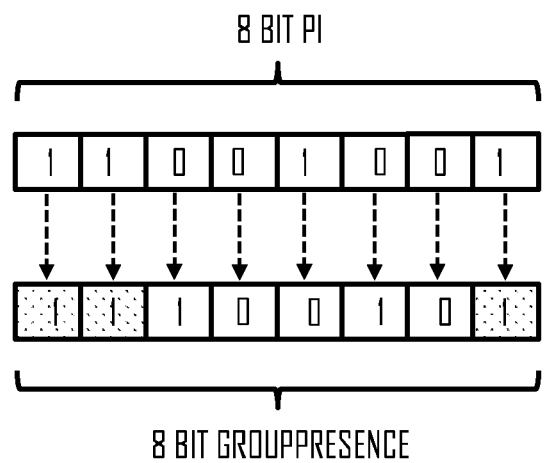

For example. the presence indication may be set of one or more groups. In an example depicted in FIG. 6B, the PI may contain 8-bits, similar to GroupPresence IE, and a bit set to '1' indicates presence of TRS/CSI-RS in a corresponding SSB group. When a specific PI bit for the SSB group is set, the UE 120 may determine that the TRS/CSI-RS is present for all the actually transmitted SSBs in the group. In case the PI bit is set to '1', as for the 5th block from the left, and the GroupPresence bit is set to '0', then there are no SSBs transmitted in this 5th group and consequently no RS transmission in this SSB. For the SSB groups for which a corresponding PI is set '0', there is no RS transmission present even if one or more of the SSBs of that SSB group are transmitted.

Although described in connection of SSB groups above, the bit wise indication may be done also for FR1 where there may be only 8 beams. Then each of the eight bits would indicate the presence of RS in a given SSB, i.e. a beam specific mapping.

The defining of the subsets may be conveyed to the UE 120 in the presence indicator configuration of step 200. For example, the configuration may define that each bit of the PI corresponds to one SSB group of the cell, e.g. in ascending or descending order. Other types of subset definitions are possible as well, such as that each bit in the PI corresponds to certain RS configuration index. In an embodiment, the defining of the subset for the UE is based on a control message. The PI configuration may be provided to UE in a system broadcast message e.g. in a SIB, or in a dedicated RRC message (e.g. RRC Release or other RRC message). The PI configuration may be provided to UE in RRC connected or in RRC idle/inactive mode. In one example the PI configuration or the PI (presence indication information) may be provided in a system information block (in same or different SIB).

In an embodiment, the reference signal occasions defined by a given subset (i.e. indicated by a given PI or a bit of a PI) are all comprised in one SSB. In an embodiment, the reference signal occasions defined by a given subset (i.e. indicated by a given PI or a bit of a PI) are all comprised in a same single group of SSBs.

In an embodiment, the reference signal occasions defined by a given subset (i.e. indicated by a given PI or a bit of a PI) are all based on one RS configuration. In an embodiment, the reference signal occasions defined by a given subset (i.e. indicated by a given PI or a bit of a PI) are all based on a same single group of RS configurations.

In an embodiment, the UE receives a control message indicating mapping of the PI or the bits of the PI with at least one of: SSB(s), SSB group (s), RS configuration(s), group of RS configurations (s).

As said earlier, in one embodiment SSBs belong to the same group of SSBs when the SSBs are associated with a same grouping parameter, wherein the grouping parameter comprises a groupPresence indication in an ssb-PositionsInBurst information element. For example, the UE may receive a control message providing group information (e.g. groupPresence or inOneGroup) on the transmitted SSBs in an SS-burst. Then, the UE may determine SSB grouping for TRS/CSI-RS presence based on the received SSB group information for transmitted SSBs.

In some other embodiments, the UE 120 may instead or additionally receive a control message indicating how SSBs are grouped and/or how RS (e.g. TRS/CSI-RS) configurations are grouped. Then the UE may define the grouping of the SSBs or reference signal configurations based on such explicit configuration message from the base station 110. In other words, the network may configure explicit grouping for TRS/CSI-RS configurations and/or for the SSBs. Regarding the TRS/CSI-RS groups, the presence indication work in similar manner as for SSB grouping. I.e. when one or more RS configurations are grouped, the presence indication, when detected for one of the RS configurations in the group, indicates the presence for the whole group of RS configurations.

In an embodiment employing grouping configuration, the network may configure the number of groups for the TRS/CSI-RS (or SSBs) and each TRS/CSI-RS configuration (or SSB) is implicitly mapped to a given group (e.g. evenly in logical ascending/descending order) or is explicitly mapped (e.g. each TRS/CSI-RS configuration is mapped to certain group or groups). Thus, with this embodiment, the grouping may be used to cause the groups of SSBs or reference signal configurations to have unequal sizes. As an example, one or more TRS/CSI-RS may be associated to one or more SSB (e.g. through QCL relationship) and TRS/CSI-RS sharing the same QCL source (e.g. SSB) may be grouped or configured to be in a group. In further example, when the PI indicates presence of at least one TRS/CSI-RS in a group, UE 120 may assume the presence of TRS/CSI-RS for all RS in the same group. In one example, when the PI indicates presence of at least one TRS/CSI-RS in a group, UE 120 may assume the presence of TRS/CSI-RS for all RS in the same group wherein the group is determined by the QCL relationship e.g. the TRS/CSI-RS that have the same QCL source RS (e.g. SSB or other CSI-RS) may be considered to be in the same group.

In an embodiment, the group size (TRS/CSI-RS or SSB) may be one. In an example, if a group size is set to one the presence indication may indicate the presence of one TRS/CSI-RS.

In an embodiment, the bit width (number of bits) for the PI may be configurable by network. In one example embodiment, the network may configure the SSB grouping in an explicit manner i.e. it may configure all SSBs in a cell in the same group, or it may form N groups of M SSBs and configure corresponding number of bits to cover the number of groups. In such a case, the network can configure the grouping with presence indication having N-bits where each bit corresponds to one group, or the network may configure a grouping where 1 bit presence indication indicates whether or not all the configured TRS/CSI-RSs that are grouped (or grouped through SSB) are present, or the 1 bit indication may be applied for all the SSBs in the group.

In one embodiment, the presence information/indicator (PI) is provided UE-group specifically. In this way, a group of UEs is provided with information indicating whether or not a given TRS/CSI-RS is present. This may take place before their paging occasion(s), for example in the early paging indication (EPI/PEI). As one alternative, a cell wide PI may be used instead or in addition to the group-wise indication.

In one embodiment the UE is configured with IDLE/INACTIVE TRS/CSI-RS. In addition, the UE is informed e.g. via dedicated signalling (e.g. RRC Release message) or via broadcast signalling (system information) whether TRS/CSI-RS is constantly present e.g. on every occasion and/or on every beam, etc. This informing may take place via the PI, for example.

In one embodiment, each presence indicator is associated with a timer defining a validity period for the received presence indicator. For example, a timer or a counter value may be configured in SI/RRC signaling that is associated with the presence indication. When the UE detects the presence indication (e.g. in EPI/PEI), the UE can assume that the TRS/CSI-RS associated with the indication are present for the duration of the timer, e.g. N milliseconds, N second or N paging cycles, as non-limiting examples. In an embodiment, the UE may assume the presence of the TRS/CSI-RSs after indicated by the network with the PI, although the PI would not be set anymore in the subsequent EPI transmission(s) during the timer running. Upon expiry of the timer, the UE cannot assume the presence of the TRS/CSI-RSs in the provided occasion(s). In an embodiment, the UE assumes that the configured TRS/CSI-RS occasions (configured by RS configurations, for example) are mapped to the actually transmitted SSBs. I.e. the configured TRS/CSI-RS resource IDs are mapped in ascending/ descending order to the actually transmitted SSBs configured in "ssb-PositionsInBurst/groupPresence" or "ssb-PositionsInBurst/inOneGroup".

Figure 7:
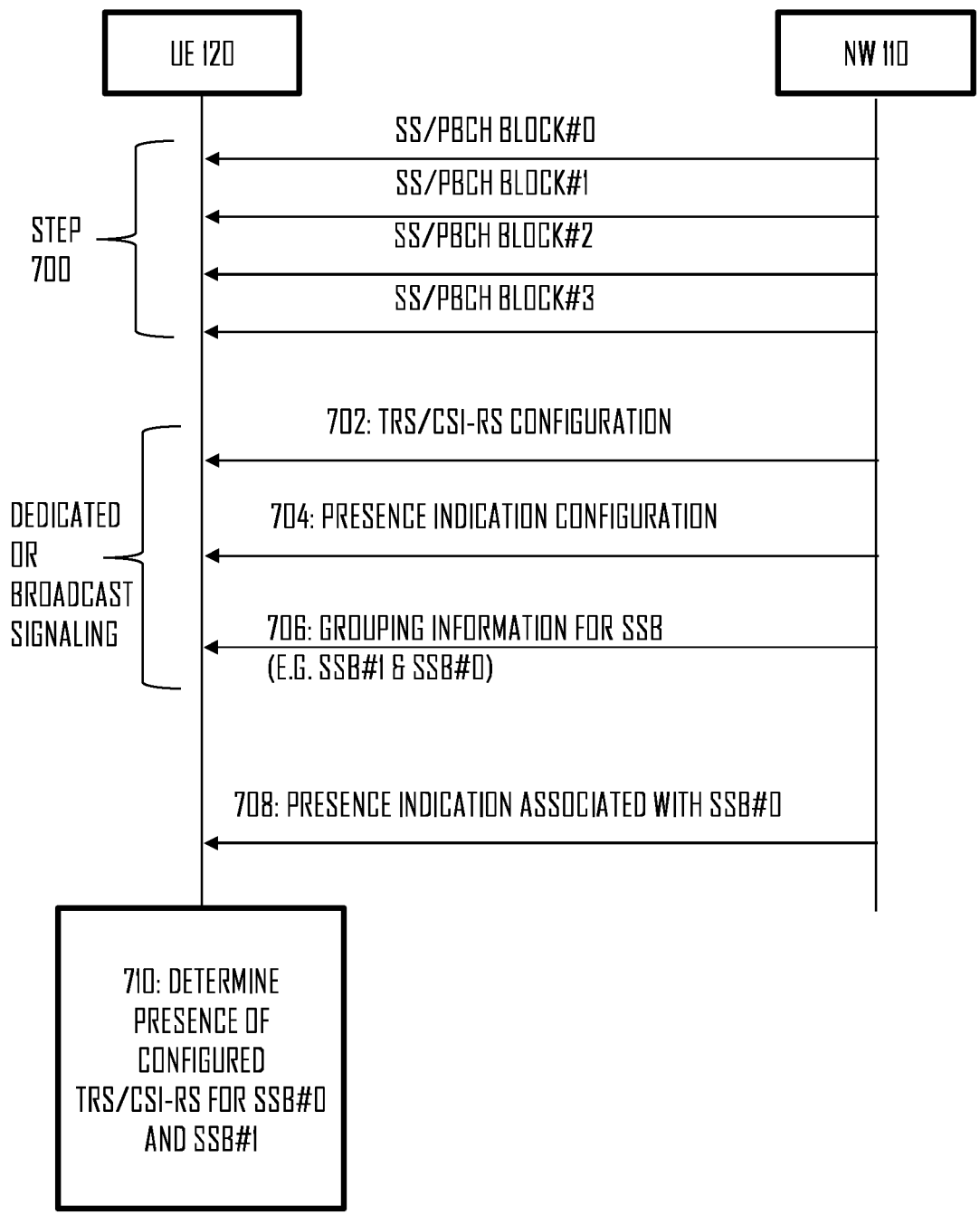

Let us take a look at the proposal from the point of view of a signaling flow diagram in FIG. 7. In step 700, the UE monitors SS/PBCH blocks from the gNB 110. These may be transmitted by the gNB 110 sequentially in multiple direction, for example. The SS/PBCH block in the step 700 may be transmitted by the network in a periodic manner. The UE 120 may receive one or more SS/PBCH blocks. This may allow the UE to perform cell search in which the UE acquires time and frequency synchronization with the cell, decodes the cell ID, extracts MIB and SIB1, for example. Each SSB can be identified by a unique number called SSB index and identification of which SSB is detected is depend on where UE is located. In step 702/204, the network, after having determined RS configuration for the cell (e.g. for SSBs of the cell), transmits one or more RS configurations to the UE. In step 200/704, after the network has determined PI configuration for the presence indicator, the network transmits the PI configuration to the UE. In step 706, the network transmits grouping information message to the UE. This may take place via ssb-PositionsInBurst message and the IEs in it, for example, or via a dedicated message. Let us assume the message indicates that SSBs #0 and #1 are grouped together. In step 202/708, the UE receives the PI sent by the gNB 110. The network may have decided which SSBs are to carry the TRS/CSI-RS and set the PI accordingly. Let as assume the PI indicates that the RSs are present for SSB #0. The indication can be a direct indication indicating that SSB #0 carry RSs or the indication can be an indirect indication indicating that a certain RS configuration is used for RS transmission, and the UE knowing associations between RS configurations and SSBs may derive the SSB ID which carries the RSs. Thereafter, in step 206/710, the UE may determine the presence of configured TRS/CSI-RS in SSBs #0 and #1. The presence in SSB #1 may be due to the grouping association between SSBs #0 and SSB #1. After this, the network may send the reference signals accordingly. As said, the SSBs of step 700 may be sent periodically by the network. E.g. in a subsequent transmission of the SSBs taking place after step 710 the network 110 may transmit the reference signals in SSBs #0 and #1, but not in SSBs #2 and 3 (event though SSBs #2 and #3 may or may not be transmitted).

Figure 8:
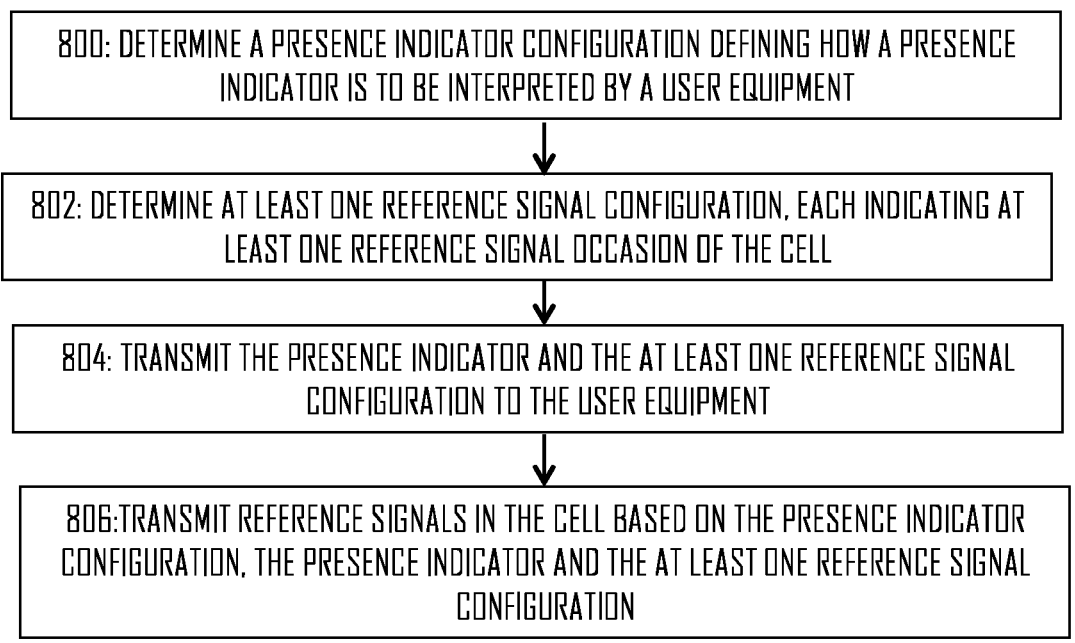

From the point of view of the network node, such as the gNB 110, an embodiment is depicted in FIG. 8. In step 800 the gNB 110 determines the presence indicator configuration defining how a presence indicator is to be interpreted by the UE receiving the PI, wherein, based on the configuration, the presence indicator indicates whether a set of one or more reference signal occasions associated with at least one SSB of a cell carries reference signals. In step 802, the gNB 110 determines at least one reference signal configuration, each indicating at least one reference signal occasion of the cell. In step 804, transmitting the presence indicator and the at least one reference signal configuration to the user equipment take place. Optionally, the network may also transmit the PI configuration to the UE. Then, in step 806, the gNB 110 may start transmitting reference signals in the cell based on the presence indicator configuration, the presence indicator and the at least one reference signal configuration.

Figure 9:
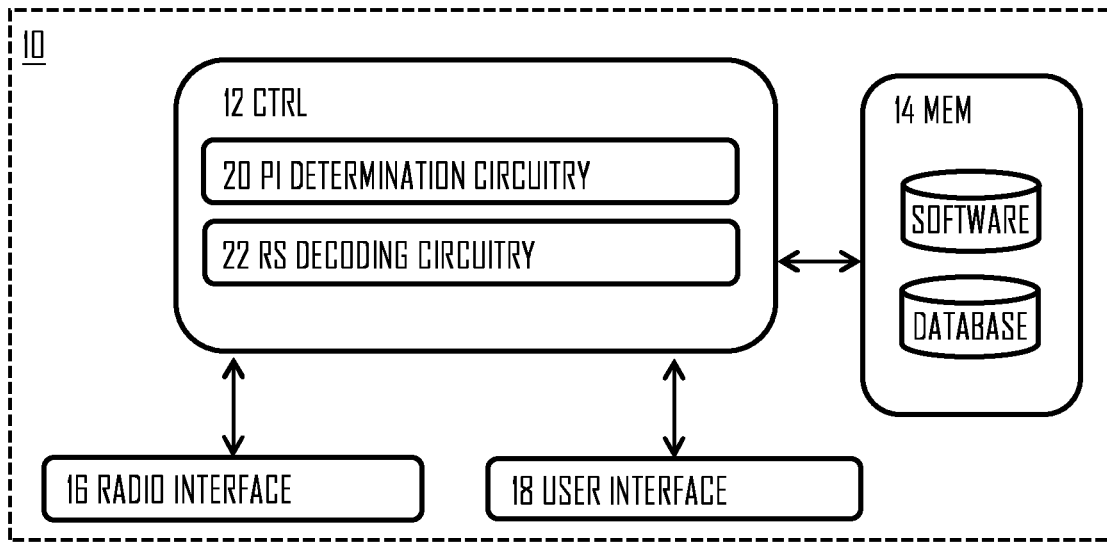
FIGS. 9 and 10 illustrate apparatuses, according to some embodiments.

An embodiment, as shown in FIG. 9, provides an apparatus 10 comprising a control circuitry (CTRL) 12, such as at least one processor, and at least one memory 14 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 10 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

In an embodiment, the apparatus 10 is or is comprised in the UE 120. The apparatus may be caused to execute some of the functionalities of the above described processes.

The apparatus may further comprise a radio interface (TRX) 16 comprising hardware and/or software for realizing communication connectivity according to one or more communication protocols. The TRX may provide the apparatus with communication capabilities to access the radio access network, for example.

The apparatus may also comprise a user interface 18 comprising, for example, at least one keypad, a microphone, a touch display, a display, a speaker, etc. The user interface may be used to control the apparatus by the user.

The control circuitry 12 may comprise a PI determination circuitry 20 for determining the PI configuration and for extracting the PI from the network, and for determining which RS occasions carry reference signals, according to any of the embodiments. The control circuitry 12 may further comprise a RS decoding circuitry 22 for decoding the RS occasions when it is detected that the RS occasion in question is carrying a reference signal, according to any of the embodiments.

Figure 10:
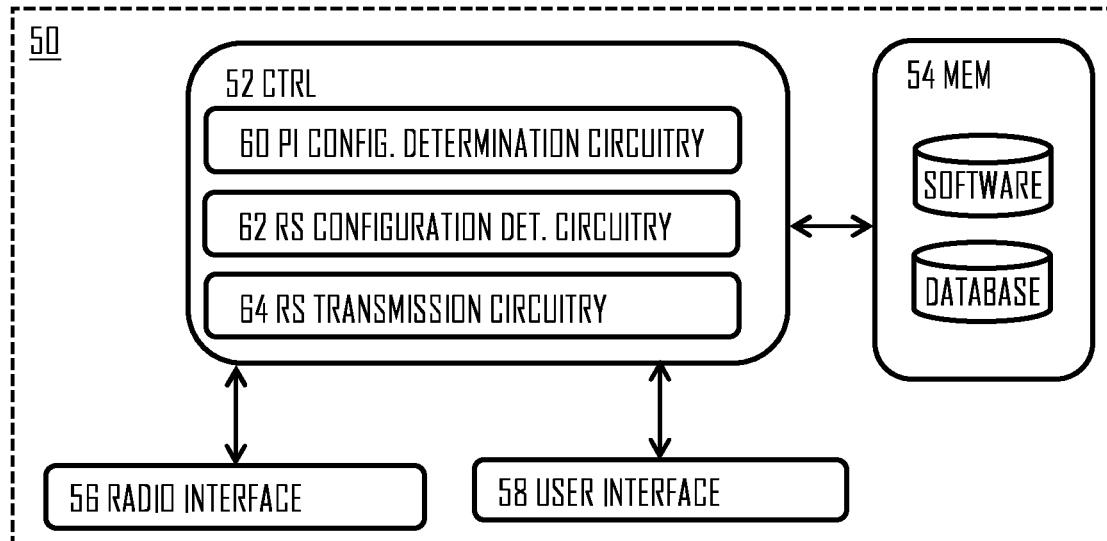

An embodiment, as shown in FIG. 10, provides an apparatus 50 comprising a control circuitry (CTRL) 52, such as at least one processor, and at least one memory 54 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 50 may be or be comprised in a network node, such as in gNB/gNB-CU/gNB-DU of 5G. In an embodiment, the apparatus is or is comprised in the network node 110. The apparatus may be caused to execute some of the functionalities of the above described processes.

In an embodiment, a CU-DU (central unit-distributed unit) architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus may be instead comprised in the distributed unit, and at least some of the described processes may be performed by the distributed unit. In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, the apparatus controls the execution of the processes, regardless of the location of the apparatus and regardless of where the processes/functions are carried out.

The apparatus may further comprise communication interface (TRX) 56 comprising hardware and/or software for realizing communication connectivity according to one or more communication protocols. The TRX may provide the apparatus with communication capabilities to access the radio access net-work, for example. The apparatus may also comprise a user interface 58 comprising, for example, at least one keypad, a microphone, a touch display, a display, a speaker, etc. The user interface may be used to control the apparatus by the user.

The control circuitry 52 may comprise a presence indicator configuration determination circuitry 60 for determining configuration for the PI, according to any of the embodiments. The control circuitry 12 may comprise a reference signal configuration determination circuitry 62 e.g. for determining the configuration of the reference signals and mapping between SSBs and RS occasions, according to any of the embodiments. The control circuitry 12 may comprise a reference signal transmission circuity 64 e.g. for transmitting reference signals in the cell, according to any of the embodiments.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor and at least one memory including a computer program code, wherein the at least one memory and the computer program code are configured, with the at least one processor, to cause the apparatus to:
   determine a presence indicator configuration defining how a presence indicator is to be interpreted, wherein, based on the configuration, the presence indicator indicates whether a set of one or more configured reference signal occasions of a cell carries reference signals;
   obtain from a base station the presence indicator, wherein each presence indicator is associated with a timer defining a validity period for each of the received presence indicator;
   obtain from the base station at least one reference signal configuration, each indicating at least one configured reference signal occasion; and
   determine, based on the presence indicator and the determined presence indicator configuration, whether a given reference signal occasion indicated by the at least one reference signal configuration carries a reference signal.

2. The apparatus of claim 1, wherein the apparatus is a user equipment in a radio resource control, RRC, idle or inactive state.

3. The apparatus of claim 1, wherein the reference signal comprises a tracking reference signal transmitted in downlink from the base station.

4. The apparatus of claim 1, wherein determining the presence indicator configuration comprises receiving information indicating the presence indicator configuration from the base station.

5. The apparatus of claim 1, wherein, based on the presence indicator configuration, the set comprises all of configured reference signal occasions associated with synchronization signal blocks, SSBs, of the cell and the presence indicator indicates whether all or none of configured reference signal occasions associated with SSBs of the cell carry reference signals.

6. The apparatus of claim 1, wherein based on the presence indicator configuration, the set comprises a subset of configured reference signal occasions associated with at least one synchronization signal block, SSB, of the cell and the presence indicator indicates whether the subset carries reference signals, the subset comprising at least one but not all configured reference signal occasions of the cell.

7. The apparatus of claim 6, wherein, according to the presence indicator configuration, the presence indicator indicates at least one of the following: those at least one SSB but not all SSBs of the cell where the reference signals are present or those at least one reference signal configuration but not all reference signal configurations of the cell according to which the reference signals are transmitted.

8. The apparatus of claim 1, wherein the at least one memory and the computer program code are configured, with the at least one processor, to cause the apparatus further to:
   detect a channel on which the presence indicator is received;
   associate the channel with at least one synchronization signal block, SSB;
   determine that the set of configured reference signal occasions corresponding to this presence indicator include those configured reference signal occasions that are comprised in the associated at least one SSB.

9. The apparatus of claim 1, wherein the at least one memory and the computer program code are configured, with the at least one processor, to cause the apparatus further to:
   associate at least one synchronization signal block, SSB, with the obtained at least one reference signal configuration;
   determine, based on the presence indicator and the presence indicator configuration, that reference signals from the base station are present in the at least one SSB.

10. The apparatus of claim 1, wherein the presence indicator is received in an early paging message.

11. The apparatus of claim 1, wherein the presence indicator is received in downlink control information, DCI, on a physical downlink control channel, PDCCH.

12. The apparatus of claim 1, wherein the at least one memory and the computer program code are configured, with the at least one processor, to cause the apparatus further to:
   determine, based on the presence indicator and the presence indicator configuration, that the set, comprising only configured reference signal occasions in a first synchronization signal block, SSB, carries reference signals;
   determine that reference signals are present also in at least one other SSB that is associated with a same group of SSBs as the first SSB.

13. The apparatus of claim 1, wherein the at least one memory and the computer program code are configured, with the at least one processor, to cause the apparatus further to:
   determine, based on the presence indicator and the presence indicator configuration, that the set, comprising only configured reference signal occasions based on a first reference signal configuration, carries reference signals;
   determine that reference signals are present also based on at least one other reference signal configuration that is associated with a same group of reference signal configurations as the first reference signal configuration.

14. The apparatus of claim 1, wherein the presence indicator comprises only a single bit.

15. The apparatus of claim 1, wherein, based on the presence indicator configuration, when the presence indicator comprises a plurality of bits, each bit indicates whether a given subset of configured reference signal occasions carries reference signals, wherein each subset comprises at least one but not all configured reference signal occasions of the cell.

16. The apparatus of claim 1, wherein the configured reference signal occasions defined by a given subset are all comprised in a same group of synchronization signal blocks, SSBs, or reference signal configurations.

17. The apparatus of claim 1, wherein grouping of the reference signal configurations is based on explicit configuration received by the apparatus from the base station.

18. An apparatus, comprising:
at least one processor and at least one memory including a computer program code, wherein the at least one memory and the computer program code are configured, with the at least one processor, to cause the apparatus to perform:
determine a presence indicator configuration defining how a presence indicator is to be interpreted by a user equipment, wherein, based on the configuration, the presence indicator indicates whether a set of one or more configured reference signal occasions of a cell carries reference signals;
determine at least one reference signal configuration, each indicating at least one configured reference signal occasion of the cell;
transmit the presence indicator and at least one reference signal configuration to the user equipment, wherein each presence indicator is associated with a timer defining a validity period for each of the received presence indicator;
transmit reference signals in the cell based on the presence indicator configuration, the presence indicator and the at least one reference signal configuration.

19. A method, comprising:
determining a presence indicator configuration defining how a presence indicator is to be interpreted, wherein, based on the configuration, the presence indicator indicates whether a set of one or more configured reference signal occasions of a cell carries reference signals;
obtaining from a base station the presence indicator, wherein each presence indicator is associated with a timer defining a validity period for each of the received presence indicator;
obtaining from the base station at least one reference signal configuration, each indicating at least one configured reference signal occasion; and
determining, based on the presence indicator and the determined presence indicator configuration, whether a given reference signal occasion indicated by the at least one reference signal configuration carries a reference signal.

* * * * *